United States Patent [19]

Sheikh

[11] Patent Number: 5,213,838
[45] Date of Patent: May 25, 1993

[54] SODIUM-FREE SALT SUBSTITUTE CONTAINING CITRATES AND METHOD FOR PRODUCING THE SAME

[76] Inventor: Morris Sheikh, 803 Canterberry Crescent, Bloomfield Hills, Mich. 48013

[21] Appl. No.: 644,618

[22] Filed: Jan. 23, 1991

[51] Int. Cl.$^5$ .............................................. A23L 1/237
[52] U.S. Cl. .................................... 426/649; 426/650; 424/692; 424/693; 424/722; 514/574
[58] Field of Search ................ 514/574; 424/722, 692, 424/693; 426/649, 650; 23/295 R, 303, 304

[56] References Cited

U.S. PATENT DOCUMENTS

| Re. 27,981 | 4/1974 | Frank et al. | 424/649 |
|---|---|---|---|
| 1,950,459 | 3/1934 | Seifert | 23/303 |
| 2,056,540 | 10/1936 | Segura | 426/649 |
| 2,471,144 | 5/1949 | Davy | 426/649 |
| 2,968,566 | 1/1961 | Munch | 426/649 |
| 4,068,006 | 1/1978 | Moritz | 426/97 |
| 4,451,494 | 5/1984 | Roan | 426/649 |
| 4,473,595 | 9/1984 | Rood et al. | 426/649 |
| 4,931,305 | 6/1990 | Karppanen et al. | 426/649 |

Primary Examiner—Allen J. Robinson
Assistant Examiner—John D. Pak
Attorney, Agent, or Firm—Basile and Hanlon

[57] ABSTRACT

A sodium-free composition suitable for use as a substitute for common table salts and a method for preparing the same. The sodium-free composition has as its primary components potassium citrates, calcium citrates, and mixtures of the two components. The material can be prepared by drying and pulverizing crystalline solids derived from a solution containing sufficient citric acid to provide an initial solution pH less than about 3.5, sufficient hydrogen ions to provide a secondary solution pH greater than about 5 and sufficient ions derived from inorganic acids selected from the group consisting of hydrogen chloride, sulfuric acid, phosphoric acid, admixtures thereof to yield a final solution pH between about 3 and about 7.8.

7 Claims, No Drawings

SODIUM-FREE SALT SUBSTITUTE CONTAINING CITRATES AND METHOD FOR PRODUCING THE SAME

BACKGROUND OF THE INVENTION

1. Field of the Invention

The present invention relates to a substitute for sodium chloride (NaCl), commonly known as table salt. More particularly, this invention is directed to a sodium-free salt substitute which provides the saline, tangy taste present in the original material and is composed essentially of non-sodium citrate salts. The salt substitute of the present invention can be successfully employed as a seasoning material in food preparation and cooking and as a table seasoning condiment.

2. Discussion of the Relevant Art

Various cardiac and renal conditions particularly those associated with edema, hypertension, arterial sclerosis, and some pregnancy complications require that the patient be placed on a salt-free diet in order to avoid further damage and ameliorate conditions to the extent that dietary control can do so. The deleterious action of table salt is due primarily to the sodium content thereof. Reduction or elimination of dietary sodium derived from table salt can ameliorate or eliminate many of the harmful conditions noted. However, elimination of table salt robs the diet of a good deal of palatability. Because of this, many cardiac and renal disease patients continue to use table salts even though it should be avoided. As a result, the patient may experience continued or further damage or, at the very least fail to obtain the alleviation of the condition under treatment. Furthermore, the tendency of dietary sodium in the diet to cause an accumulation and retention of fluids with corresponding increase in the weight of body tissues has emphasized the importance of reducing sodium intake in various weight loss diets.

Salt hunger, or the desire for salt, appears to be a primary instinct in humans which is shared by many animals. It is an important part of the taste sense or taste patterns for most people. Consequently, food without salt is found to be substantially tasteless, flat and unpalatable. Thus, the necessity for adhering to a low-salt or saltless diet imposes a very genuine hardship on persons suffering from such medical conditions. In addition to the decreased enjoyment which is derived from these unseasoned foods, additional impairment of health may be experienced because the unpalatable food is not as easily as ingested as that which is readily enjoyed. Many attempts have been made to provide salty tasting compositions as a substitute for table salt. To this end, potassium chloride, ammonium chloride and similar compounds have been suggested. However, the use of these chlorides alone or in combination does not provide the desired taste or seasoning effect of sodium chloride. Potassium chloride has a strong aftertaste which is usually characterized as bitter by most people. Ammonium chloride also has a bitter after taste and, when ingested, can disturb that acidized and base balance in the blood and produce undesirable side effects. Furthermore, ammonium chloride decomposes at cooking and baking temperatures thereby changing the pH value of the surrounding material affecting the taste and other properties of any cooked foods which contain it.

Because of this, a variety of sodium-free and low-sodium compositions have been proposed which contain a variety of constituents added in an attempt to mimic the flavor of sodium chloride.

In U.S. Pat. No. 2,471,144 to Davy, a sodium-free preparation containing a mixture of potassium chloride and ammonium chloride as the primary saline constituent is disclosed. The Davy composition includes small amounts of calcium and magnesium cations as well as trace amounts of citrate and formate anions added to "smooth out" the bitter taste imparted by potassium and ammonium chlorides. The amount of citrate ions employed in the Davy composition is approximately 1% of the total ingredients.

U.S. Pat. No. 2,968,566 to Munch discloses a sodium-free salt substitute which contains a major portion of potassium chloride and minor amounts of gluconate, citrate and ascorbate ions employed to mask the bitter after-taste inherent with the use of the potassium chloride. Because sodium chloride has an inherently "sweet" element which enhances its ultimate saline taste, the Munch reference also recommends the use of trace amounts of an artificial sweetener such as calcium cyclamate or saccharine to mimic this sweet taste.

Various other materials have been employed to mask the bitter after-taste inherent in the use of potassium chloride. U.S. Pat. No. 4,451,494 to Roan discloses a sodium-free salt substitute which includes from about 0.1% to about 2% by weight of a hydrolyzed collagenous animal protein employed as the sole masking agent in a potassium chloride-based salt substitute.

Various salt substitute having reduced sodium levels have also been proposed in an attempt to overcome the inherent bitterness of chloride-based salt substitutes and to provide materials which are palatable. One such "salt substitute" is disclosed in U.S. Pat. No. 3,514,296 to Frank et al. in which a low-sodium salt substitute comprised of 20-80% by weight of potassium chloride and 80-20% by weight of sodium chloride is discussed. Another such material is disclosed in U.S. Pat. No. 4,473,595 to Rood et al. in which a salt substitute is prepared which contains between about 40 to about 50% by weight sodium chloride in admixture with about 25-35% by weight potassium chloride and about 15 to about 25% of a magnesium salt such as magnesium sulphate or magnesium chloride.

Thus, it can be seen that the majority of salt substitutes having acceptable palatability contain reduced levels of sodium. Sodium free salt-substitutes exhibit undesirable qualities of bitterness which must be masked through the use of a variety of additives which fail to provide a salt substitute which effectively mimics the various perceived tastes of sodium chloride and at the very least, has a truly pleasant taste.

Thus, it would be desirable to provide a salt substitute which is completely sodium-free and does not produce the bitter taste inherent in compositions which contain potassium chloride or calcium chloride as their major element. It would also be desirable to provide a salt substitute which closely imitates or approximates the complex combination of sensory taste perceptions such as salinity, sweetness, sourness and the like which occur when sodium chloride is employed. It is also desirable to provide a salt substitute which does not require the presence of complex additives to enhance palatability. Finally, it is desirable to provide a method for producing such a material.

SUMMARY OF THE INVENTION

The present invention is a sodium-free composition suitable for use as a substitute for common table salt (NaCl) and a method for making the same.

In preparing the salt substitute of the present invention, crystalline solids derived from a solution containing sufficient citric acid to provide an initial solution pH equal to or less than about 3.5 and sufficient to provide a secondary solution pH of greater than or equal to about 5 are harvested. The basic anions employed may be derived from any suitable non-sodium containing, water soluble inorganic material which will function as a suitable base. The inorganic base is preferably a suitable alkali metal or alkaline earth group hydroxide selected from the group consisting of magnesium hydroxide, potassium hydroxide, calcium hydroxide, and mixtures thereof. The solution may also contain sufficient ions derived from inorganic acids added to the secondary solution to yield a final solution pH between about 3.0 and about 7.8, the inorganic acids selected from the group consisting of hydrogen chloride, hydrogen sulfate, hydrogen phosphate, and mixtures thereof.

The sodium-free composition derived by this method contains as its major constituent potassium and calcium salts of citric acid together and may optionally contain minor amounts of chloride salts such as potassium chloride. Additionally, where magnesium cations are employed the material can contain amounts of magnesium citrate suitable for therapeutic use as a gentle dietary laxative additive.

DESCRIPTION OF THE PREFERRED EMBODIMENT

The present invention is predicated upon the discovery that a composition containing as its major component various alkali metal and alkali earth metal salts of citric acid can be employed as an effect substitute for sodium chloride. The composition has been found to effectively mimic the combination of salty, sweet and sour characteristics attributable to sodium chloride. Heretofore, it has been believed that the citrate salts would be too "sweet" for use as a major component in a salt-substitute composition.

In the present invention, a method is disclosed in which calcium citrate, potassium citrate or a mixture of various non-sodium citrate salts are prepared in which the pH of the aqueous solution containing the precursor materials is carefully manipulated within defined ranges to yield a material which successfully mimics the combination of saline, sweet and sour taste elements when ingesting sodium chloride.

The method of the present invention comprises the steps of:

a) adding an effective amount of a source of citrate ions to an aqueous solution, the citrate ion source being derived, at least in part, from citric acid, to provide a solution pH below about 3.5;

b) admixing an amount of an inorganic hydroxide with the citric acid solution, sufficient to provide a solution pH greater than about 5.0, the alkali metal hydroxide selected from the group consisting of potassium hydroxide, calcium hydroxide, and mixtures thereof; and c) separating and removing crystalline salts from the resulting solution.

It is to be understood that the concentrations of the various ions added in the method of the present invention can affect the ultimate yield of the resulting crystalline material. Thus, the term "sufficient amount" is to be considered as that amount of citrate ions which will react with alkali metal cations introduced as alkali metal hydroxides to produce the specified alkali metal citrates of the present invention. It is to be appreciated that greater concentrations in the solution will provide greater yield.

The source of citrate ions employed in the present invention is, preferably, food grade citric acid. Food grade citric acid is commercially available as an article of commerce from a variety of sources. The term "food-grade" as used herein is defined as materials which are generally recognized as safe for human consumption, as that term is defined by the United States Food and Drug Administration.

A portion of food-grade citric acid solution is admixed with sufficient water to provide a solution pH less than about 3.5; with a pH in the range of 1.0 to 3.5 being preferred. It is to be understood that the water employed in the present invention is essentially free of sodium cations. Thus, in the preferred embodiment, the water employed is processed to rid it of essentially all undesirable ionic material. Water which has been commercially deionized and distilled may successfully be employed provided that the sodium ion content introduced falls below any acceptable minimum sodium concentrations which may exist for sodium-free salt substitutes.

In the method of the present invention, the deionized water employed preferably has an initial pH between about 6.0 and about 7.5. It is to be understood that this is a general range within which the pH of deionized distilled water generally falls. The pH may vary above or below this range provided factors contributing to this variance in pH level will not interfere with formation of crystalline citric acid salts. It is also to be understood that a variety of food-grade acids can be introduced in minor amounts in conjunction with the citric acid to produce the desired solution pH provided that these additional materials do not interfere with the taste, safety, or performance of the resulting salt. Thus, while it is preferred that citric acid alone be employed in the method of the present invention, other organic and inorganic acids can be optionally employed in minor amounts when used in conjunction with citrate acid. Suitable acids can be selected from the group consisting of hydrogen chloride, phosphoric acid, sulfuric acid and mixtures thereof.

Admixture of deionized water and citric acid can occur at any solution temperature in the range between about 20° C. and boiling (about 100° C.). It is to be understood that addition of the various components can affect solution temperature and can elevate or depress the actual boiling point of the solution. It is preferred that the solution temperature be maintained at a temperature which maximizes the solution concentration of the various constituents but minimizes solution evaporation during the admixture stages.

After obtaining a solution pH between about 1 and about 3.5 by the addition of citric acid, a suitable base is admixed in the solution in an amount sufficient to elevate the solution pH to a level generally above 5.0 and preferably between about 5.0 and about 7.0.

The base employed can be any suitable food grade material which can readily dissociates in water contains cations from Groups IA and IIA, and is capable of elevating the pH in a citric acid solution. The material of choice is a strong inorganic base such as an alkali metal hydroxide or an alkaline earth group hydroxide preferably selected from the group consisting of potassium hydroxide, calcium hydroxide, magnesium hydroxide, and mixtures thereof. The base chosen is preferably composed of major portions of calcium hydroxide, potassium hydroxide and mixtures thereof. Optionally, there can be added minor portions of magnesium hydroxide. It is to be understood that magnesium cations are bioactive. Magnesium can produce a laxative effect when consumed in therapeutic dosages. Thus, magnesium can be advantageously used in small measured dosages as a dietary anti-constipatory agent. The amount of magnesium hydroxide employed can be determined by one reasonably skilled in relevant pharmaceutical art.

It is to be understood that some of the various calcium salts thus produced have lower solubilities than their potassium or magnesium counterparts. Thus, certain problems can be encountered with ready dissolution of various non-citrate calcium salts; particularly when cooking or baking. In such procedures it is possible that undesired precipitation of non-dissolved material can occur.

This phenomenon is not seen as a problem when the material is employed prior to ingestion as a table seasoning. In such instances the calcium salts alone or in combination with potassium and magnesium salts provide a suitably salty taste. Additionally, such materials provide a source of dietary calcium desirable for good nutrition. When and if the salt substitute is to be employed in cooking, measures readily apparent to one reasonably skilled in the art can be taken to minimize the concentration of insoluble calcium salts produced as a result of the process of the present invention should insolubility and precipitation be deemed a problem.

Once the addition and admixture of the basic material is completed, crystalline salts may be separated and removed from the resulting solution. The crystalline salts may be further processed and the remaining solution recovered and reused for subsequent salt formation. Removal of crystalline salts may proceed by any number of conventional methods. In the preferred embodiment, the resulting solution is placed in a vacuum evaporator to draw off the majority of the water present. This material can then be reused for additional salt processing a continuous economical process. The precipitate which results upon evaporation can be separated and dried in a manner which preserves the crystalline integrity of the resulting solids. The dried material can then be ground as necessary to provide a free flowing crystalline salt substitute.

Without being bound to any theory, it is believed that the reaction which occurs in solution is a substitution reaction in which citrate anions combine with the calcium, potassium and, the optional magnesium cations present in solution to provide a mixture of calcium citrate, potassium citrate, and, optionally, magnesium citrate. The dried material exhibits a crystalline structure which, when pulverized, is similar in volume, flow characteristics, and appearance to conventional table salt made of sodium chloride. Because of the similarity in volume, the resulting material can be readily measured and employed in all aspects of food preparation and serving. The material generally exhibits characteristics of salinity similar to conventional table salt.

The resulting salt is suitable for use as is. However, some individuals may perceive the taste of the salt substitute produced by the previously described method as lacking some of the tang of conventional salt. Accordingly the method of the present invention may be modified to include an additional taste refining or "delectizing" step.

The delectizing step of the present invention occurs before the separation steps discussed previously are begun. In this step, an inorganic acid readily dissociable in the citric acid/hydroxide solution is added in a amount sufficient to adjust the solution pH upward to a level between about 3.5 and about 7.8. The acid employed is a food grade acid which is preferably an inorganic material which, when added to the solution, will impart a certain tangy or sour component to the resulting crystalline material and offset any undesired sweetness inherent in the citrate mixture. The acid may be selected from the group consisting of hydrogen chloride, sulfuric acid, phosphoric acid, and mixtures thereof. In the preferred embodiment, the inorganic acid is food grade hydrogen chloride.

Addition of the hydrogen chloride with the concomitant lowering of the solution pH may initiate some precipitation of the crystalline material. Further precipitation, separation, and removal of the resulting crystalline salts can proceed in the manner described previously.

When desired the salt substitute of the present invention may be subjected to a post-processing step to reduce clumping and sticking due to hygroscopicity in which a thin, permeable outer shell comprising a material of limited water solubility is produced on the formulated crystals.

It has been found unexpectedly that components in the salt substitute near the surface of the respective crystals will react with aqueous solutions containing small amounts of certain acids or inorganic salts to produce an extremely thin but permeable crust completely surrounding each respective crystal composed essentially of a material which is not reactive to water or water vapor. The formation of the crust can be described as an eggshell affect which results to render the crystals non-reactive to trace amounts of water such as would be present as atmospheric humidity or the like.

In order to accomplish this, the crystals are brought into contact with an aqueous solution containing cations which are capable of differentially reacting with anions present at or near the surface of the crystals to form compounds which are insoluble or have modest solubility in water. The material may be sprayed onto a fluidized bed of salt crystals to permit appropriate contact and reaction or administered in any other suitable manner.

The aqueous solution employed preferably contains an inorganic material selected from the group consisting of phosphoric acid, sulfuric acid, potassium phosphate, potassium sulfate, potassium carbonate, and mixtures thereof in an amount sufficient to react with calcium present at or near the crystal surfaces to produce a thin overlaying crust. The crust or shell thus produced is extremely thin but provides sufficient protection.

Having thus disclosed this invention, the following illustrative examples are included. It is to be understood that the examples are included for illustrative purposes only and are not to be construed as limitative of the present invention.

EXAMPLE I

One hundred grams of deionized, distilled water having a solution pH of 6.5 is added to a clean 2 liter beaker.

The beaker is placed on a magnetic stirring apparatus and is stirred at a moderate rate with constant pH monitoring. Saturated fifty grams of food grade citric acid is slowly added to the solution with constant stirring and pH monitoring. The pH of the solution after addition is 2.5. The solution is, then, stirred to insure complete dissolution and mixture of the citric acid.

Two saturated hydroxide solutions are prepared by the admixture of potassium or calcium hydroxide respectively with distilled, deionized water.

The saturated potassium hydroxide solution is slowly and carefully added to the citric acid solution with careful continuous mixing. The pH of the solution is monitored and allowed to rise to 3.0. The saturated calcium hydroxide solution is then added in an amount sufficient to elevate the solution pH to 4.0. The material is thoroughly admixed and, then, is removed from the beaker to a rotary vacuum evaporator where the aqueous material is drawn off and recycled as deionized water. A crystalline precipitate in the form of a slurry is formed with the evaporation of the majority of the water. Before total dryness, the slurry is transferred from the rotary vacuum evaporator to a drying dish where it is exposed to heated air to promote drying. The resulting material is a white crystalline solid which is pulverized with a conventional motor and pestle to yield a free flowing crystalline material.

EXAMPLE II

A solution is prepared by the steps outlined in Example I. Before the material is removed from the magnetic stirrer, a portion of 0.1 to 1.0% food grade hydrochloric acid is carefully added to the stirring material in an amount sufficient to reduce the pH from 5.2 to 4.1. The resulting material is then evaporated to create a precipitate slurry in the manner described in Example I. The slurry is then transferred and dried to produce a white crystalline salt which could be ground into a free flowing crystalline material.

EXAMPLE III

The crystalline materials of Examples I and II are evaluated for their taste and performance. The crystalline material of Example I is determined to lack a certain tanginess and have a certain sweet tasting element which are uncharacteristic of sodium chloride. The second material was tested and found to have a tangy, saline taste which closely approximated sodium chloride. Portions of the two resulting salt substitutes are employed on a variety of ready-to-serve foods which included fresh vegetables, cooked vegetables and a variety of proteins such as fish, poultry and red meat. It is reported that the two materials increased the palatability and taste of the various food materials in measured quantities which essentially equalled sodium chloride.

What is claimed is:

1. A method for preparing a sodium free seasoning composition which closely approximates the taste of sodium chloride and is suitable for use as a substitute for common table salt, the sodium-free composition consisting essentially of a citrate salt selected from the group consisting of potassium citrate, calcium citrate, magnesium citrate and mixtures thereof and minor amounts of acids of said citrate salt, the method comprising the step of:

drying and pulverizing crystalline solid salts which consist essentially of citrates selected from the group consisting of potassium citrate, calcium citrate, magnesium citrate and mixtures thereof, said crystalline solid salts derived from a deionized aqueous solution maintained at a temperature between 20° C. and 100° C., the solution consisting essentially of sufficient citric acid to provide an initial solution pH less than about 3.5, and sufficient basic hydroxide material selected from the group consisting of potassium hydroxide, magnesium hydroxide, calcium hydroxide, and mixtures thereof to provide a secondary solution pH of between about 5 and about 7.8.

2. The method of claim 1 further comprising the step of adding a sufficient amount of an aqueous food grade inorganic acid selected from the group consisting of hydrogen chloride, sulfuric acid, phosphoric acid, and mixtures thereof to yield a final solution pH between about 3.0 and about 7.8, said addition occurring prior to deriving said crystalline solids.

3. The method of claim 2 wherein the final solution pH is between about 4.0 and about 5.0.

4. A method for preparing a sodium free seasoning composition having a taste which closely approximates that of sodium chloride and is suitable for use as a substitute for common table salt, the sodium-free composition consisting essentially of a citrate salt selected from the group consisting of potassium citrate, calcium citrate, and mixtures thereof, and an acidic form of said citrate salt, the method comprising the steps of:

adding an effective amount of a source of sodium free citrate ions derived, at least in part, from citric acid to essentially sodium free deionized aqueous water having a pH between about 6.0 and about 7.5 to form a citric acid solution having a pH between about 1.0 and about 3.5, said aqueous citric acid solution having a temperature between about 20° C. and about 100° C.;

admixing an amount of an inorganic hydroxide with said citric acid solution sufficient to yield an admixed solution having a pH between about 5.0 and about 7.0, said inorganic hydroxide selected from the group consisting of potassium hydroxide, calcium hydroxide, and mixtures thereof;

allowing said sodium free citrate ions to react with ions derived from said inorganic hydroxide to form a crystalline salt reaction product consisting essentially of a citrate salt selected from the group consisting of potassium citrate, calcium citrate, and mixtures thereof, and an acidic form of said citrate salt; and separating and removing said crystalline salt reaction product from said solution.

5. The method of claim 4 further comprising the taste adjustment step of:

adding a sufficient amount of an inorganic acid readily dissociable in said admixed solution to said admixed solution to yield a final solution pH between about 4.0 and about 5.0, said inorganic acid selected from the group consisting of hydrogen chloride, sulfuric acid, phosphoric acid, and mixtures thereof.

6. The method of claim 5 further comprising the step of:

producing a slurry from said resulting aqueous solution by progressive removal and recovery of water therefrom while maintaining crystalline integrity of solids resulting therefrom.

7. The method of claim 6 further comprising the step of:

drying said slurry to produce crystalline solids.

* * * * *